United States Patent
Adamec et al.

(10) Patent No.: US 6,243,690 B1
(45) Date of Patent: *Jun. 5, 2001

(54) ELECTRONIC PRICE LABEL INCLUDING A PLURALITY OF SEPARATELY ADDRESSABLE DISPLAYS

(75) Inventors: Andrew J. Adamec, Duluth; John C. Goodwin, III, Suwanee, both of GA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/992,665

(22) Filed: Dec. 17, 1997

(51) Int. Cl.[7] ................................................ G06F 17/60

(52) U.S. Cl. ............................ 705/20; 705/26; 705/27; 705/16; 705/416; 235/383; 340/825.3; 340/825.35; 340/815.4; 345/30; 40/447

(58) Field of Search .................................... 705/20, 26, 27, 705/16, 416; 235/383; 340/825.3, 825.35, 815.4; 345/30; 40/447

(56) References Cited

U.S. PATENT DOCUMENTS

| | | | |
|---|---|---|---|
| 4,002,886 | * 1/1977 | Sundelin | 235/61.7 R |
| 4,500,880 | 2/1985 | Gomersall et al. | 340/825.345 |
| 4,750,130 | * 6/1988 | Shimamura et al. | 364/465 |
| 4,766,295 | * 8/1988 | Davis et al. | 235/383 |
| 4,924,363 | 5/1990 | Kornelson | 362/125 |
| 5,111,196 | * 5/1992 | Hunt | 340/825.35 |
| 5,172,314 | * 12/1992 | Poland et al. | 364/401 |
| 5,406,035 | * 4/1995 | Wallisch | 177/25.15 |
| 5,448,226 | 9/1995 | Failing, Jr. et al. | 340/825.35 |
| 5,461,561 | * 10/1995 | Ackerman et al. | 364/401 |
| 5,575,100 | * 11/1996 | Marvin et al. | 40/642 |
| 5,758,064 | * 5/1998 | Zimmerman et al. | 395/165 |
| 5,794,215 | * 8/1998 | Goodwin, III | 705/26 |
| 5,818,346 | * 10/1998 | Goodwin, III et al. | 340/825.49 |
| 5,847,378 | * 12/1998 | Goodwin, III | 235/383 |

(List continued on next page.)

FOREIGN PATENT DOCUMENTS

0913787  * 5/1999  (EP) .
0989506  * 5/1999  (EP) .

OTHER PUBLICATIONS

Fensholt, Carol, 'Shelf Labels Go Electronic, Merchandising goes Dynamic', Supermarket Business v42n5, pp 46–49, May 1988.*

'Telepanel Systems Inc. Announces First Half Results; Revenue Up 75% Over Last Year's First Half', PR Newswire, Sep. 1995.*

Zimmerman, Denise, 'Overwaitea testing format. (Overwaitea Food Group developing automated store that requires only three employess)', Supermarket News, v44, n38, p3A(1), Sep. 1994.*

*Primary Examiner*—Eric W. Stamber
*Assistant Examiner*—Akiba Robinson-Boyce
(74) *Attorney, Agent, or Firm*—Paul W. Martin

(57) ABSTRACT

An electronic price label (EPL) which includes a plurality of separately-addressable displays. The EPL includes a housing, a first display identified by a first unique identification number, a second display within the housing identified by a second unique identification number, and circuitry within the housing for controlling each of the first and second displays in response to messages received by the circuitry which are addressed to the first and second displays using the first and second unique identification numbers.

22 Claims, 6 Drawing Sheets

U.S. PATENT DOCUMENTS

| | | | |
|---|---|---|---|
| 5,854,476 | * 12/1998 | Goodwin, III | 235/383 |
| 5,870,714 | * 2/1999 | Shetty et al. | 705/20 |
| 5,898,383 | * 4/1999 | Forsythe | 340/825.35 |
| 5,907,143 | * 5/1999 | Goodwin, III | 235/383 |
| 5,917,422 | * 6/1999 | Adamec et al. | 340/825.35 |
| 5,918,212 | * 6/1999 | Goodwin, III | 705/20 |
| 5,926,797 | * 7/1999 | Goodwin, III | 705/20 |
| 5,929,770 | * 7/1999 | Faita | 340/825.35 |
| 5,987,427 | * 11/1999 | Goodwin, III et al. | 705/21 |
| 6,047,263 | * 4/2000 | Goodwin, III | 705/20 |
| 6,098,049 | * 8/2000 | Goodwin, III et al. | 705/21 |

* cited by examiner

ELECTRONIC PRICE LABEL INCLUDING A PLURALITY OF SEPARATELY ADDRESSABLE DISPLAYS

BACKGROUND OF THE INVENTION

The present invention relates to price display systems used in transaction establishments, and more specifically to an electronic price label (EPL) including a plurality of separately addressable displays.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency (RF) transmitters. EPLs systems of the assignee of the present invention employ RF transmitters and modulated backscatter techniques. An EPL computer transmits polling signals to one or more EPLs. In order to respond to the poll, an EPL "reflects" the polling signal back to the EPL computer within a predetermined time interval of receiving the polling signal. A good analogy of the RF modulated backscatter acknowledgment signal is a mirror reflection. If two men face each other, one with a flashlight and the other with a mirror, the man with the mirror can send an acknowledgment to the man with the flashlight by reflecting the beam of light back to him. Similarly, the man with the mirror may indicate the opposite by not reflecting the light of the flashlight.

Modulated backscatter techniques are taught in U.S. Pat. No. 5,640,683, to Evans et al., entitled "Modulated Backscatter Wireless Communication System Having An Extended Range", issued Jun. 17, 1997. This patent is hereby incorporated by reference.

Typical EPLs have limited functionality. They have small displays, limited memory, and a simple communications protocol. Functionality is usually limited because cost is limited. Uses for EPLs exist that cannot be satisfied by current EPLs. For example, current EPLs do not readily function as marketing tools that attract and inform customers, because they are incapable of displaying long promotional messages. Also, current EPLs are too large to be located on shelves adjacent small merchandise items.

Therefore, it would be desirable to provide an EPL including a plurality of separately addressable displays to solve these and other problems.

SUMMARY OF THE INVENTION

In accordance with the teachings of the present invention, an electronic price label (EPL) including a plurality of separately addressable displays is provided.

The EPL includes a housing, a first display identified by a first unique identification number, a second display within the housing identified by a second unique identification number, and circuitry within the housing for controlling each of the first and second displays in response to messages received by the circuitry which are addressed to the first and second displays using the first and second unique identification numbers.

In a first embodiment, the first display displays first information associated with a first merchandise item and the second display displays second information associated with a second merchandise item.

In a second embodiment, the first and second displays display a promotional message.

It is accordingly an object of the present invention to provide an EPL including a plurality of separately addressable displays.

It is another object of the present invention to combine a plurality of separately addressable EPLs into a single housing for displaying prices of a plurality of different merchandise items that are too small to permit mounting of a plurality of separately housed EPLs.

It is another object of the present invention to combine a plurality of separately addressable EPLs into a single housing with their displays arranged in adjacent fashion so as to create a single display which is larger than any one of the displays in the EPLs for displaying promotional messages.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
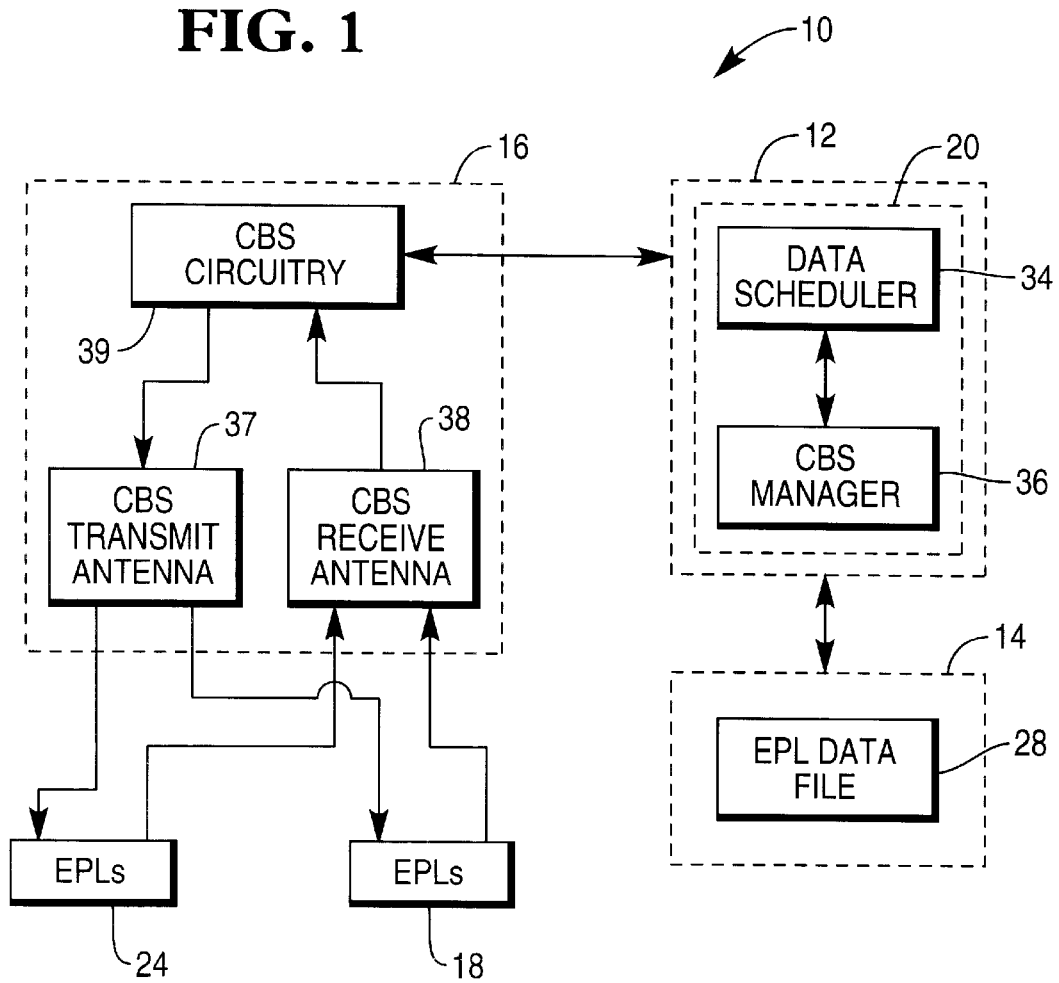
FIG. 1 is a block diagram of an EPL system.

Referring now to FIG. 1, EPL system 10 includes computer 12, storage medium 14, communication base station (CBS) 16, electronic price labels (EPLs) 18, and EPL 24 of the present invention. EPL system 10 makes use of modulated backscatter communication techniques.

Computer 12 executes EPL control software 20. EPL control software 20 records, schedules, and transmits all messages to EPLs 18 and 24 through CBS 16, and receives and analyzes messages from EPLs 18 and 24 through CBS 16. Such messages may include price information and promotional information.

EPL control software 20 maintains and uses EPL data file 28. EPL data file 28 contains item information, EPL identification information, and status information for each of EPLs 18 and EPL 24.

EPL control software 20 primarily includes data scheduler 34 and CBS manager 36. Data scheduler 34 schedules EPL price change messages to be sent to EPLs 18 and 24 through CBS 16.

Storage medium 14 is preferably a fixed disk drive. Storage medium 14 stores EPL data file 28.

CBS 16 preferably includes one transmit antenna 37 and from one to four receive antennas 38 for transmitting and receiving messages between CBS 16 and EPLs 18 and 24. CBS 16 includes CBS circuitry 39 which controls operation of CBS 16. EPL system 10 preferably includes a plurality of CBSs 16 connected together in series.

CBS manager 36 schedules transmission of price change messages and promotional messages to EPLs 18 and 24. CBS manager 36 controls reception of status messages from EPLs 18 and 24.

Figure 2A:
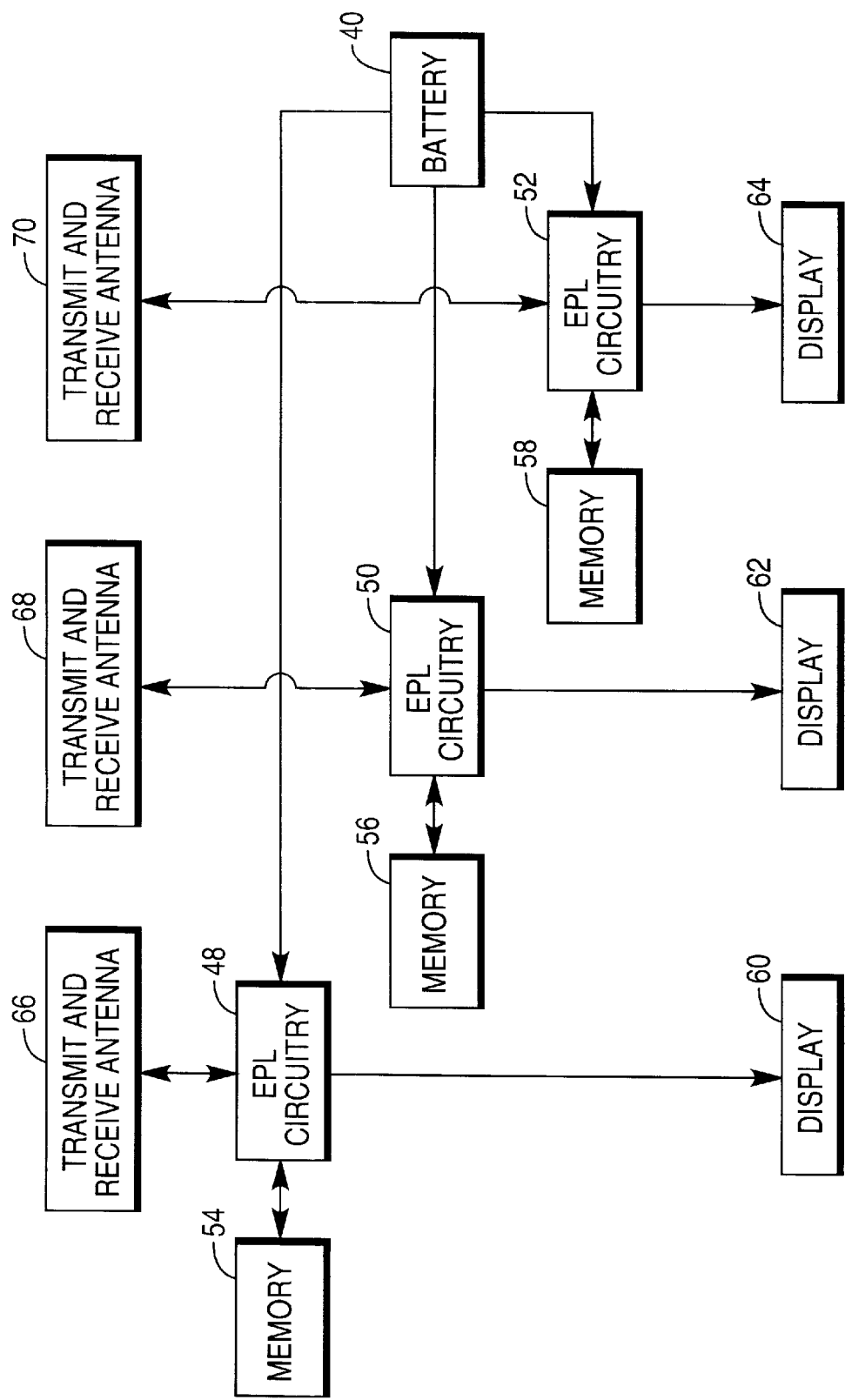
FIG. 2A is a block diagram of a first embodiment of an EPL in accordance with the present invention.

Turning now to FIG. 2A, a first embodiment of EPL 24 is illustrated.

In this embodiment, EPL 24 is a combination of a plurality of EPLs 18 which share a common battery 40. Here, three EPLs 18 provide the hardware for EPL 24. A first EPL 18 provides EPL circuitry 48, memory 54, display 60, and transmit and receive antenna 66. A second EPL 18 provides EPL circuitry 50, memory 56, display 62, and transmit and receive antenna 68. A third EPL 18 provides EPL circuitry 52, memory 58, display 64, and transmit and receive antenna 70.

Battery 40 provides power to EPL 24 and is more powerful than any single battery in EPLs 18.

Displays 60–64 are preferably liquid crystal displays (LCDs).

Memories 54–58 store messages from EPL computer 12.

EPL circuitries 48–52 store received messages from EPL computer 12 and transmit response messages to EPL computer 12. EPL circuitries 48–52 have their own EPL identification numbers. Thus, EPL computer 12 communicates with EPL circuitries 48–52 as if they were separate EPLs 18.

Transmit and receive antennae 66–70 transmit acknowledgment messages from EPL circuitries 48–52 and receive price change and other control messages from EPL computer 12. Since EPL 24 is made from separate EPLs 18, it operates in the same frequency range as EPLs 18.

Figure 2B:
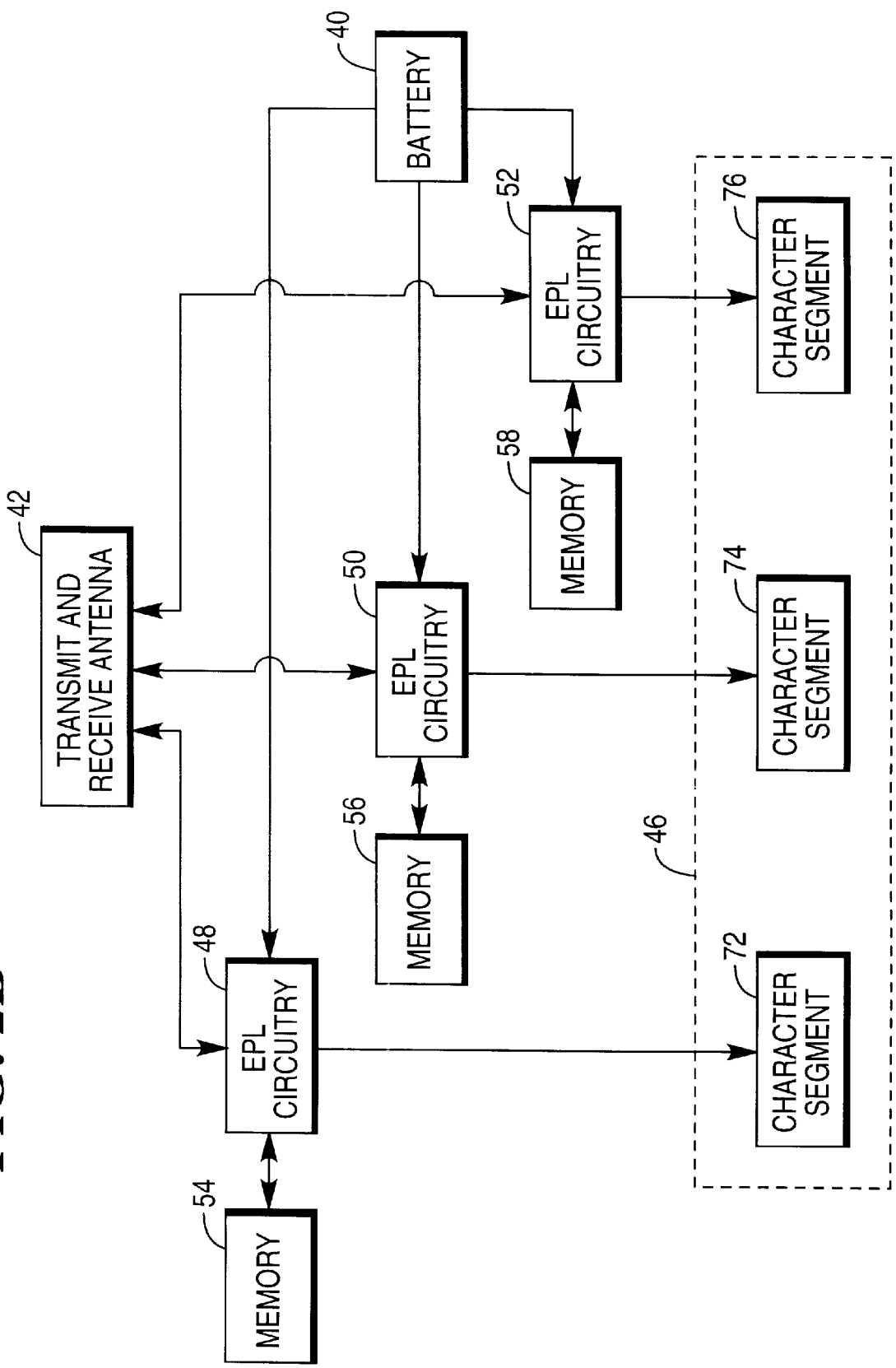
FIG. 2B is a block diagram of a second embodiment of an EPL in accordance with the present invention.

Turning now to FIG. 2B, a second embodiment of EPL 24 is illustrated.

In this embodiment, EPL 24 is also a combination of a plurality of EPLs 18, except that EPL 24 includes a single battery 40, transmit and receive antenna 42, and display 46.

Display 46 is preferably a liquid crystal display (LCD). Display 46 includes character segments 72–76 which preferably consist of eight characters each. EPL circuitry 48 communicates with character segment 72. EPL circuitry 50 communicates with character segment 74. EPL circuitry 52 communicates with character segment 76.

This embodiment is particularly suited for displaying promotional messages, including scrolling promotional messages. The promotional messages are formed from the combination of characters displayed by character segments 72–76.

Figure 3:
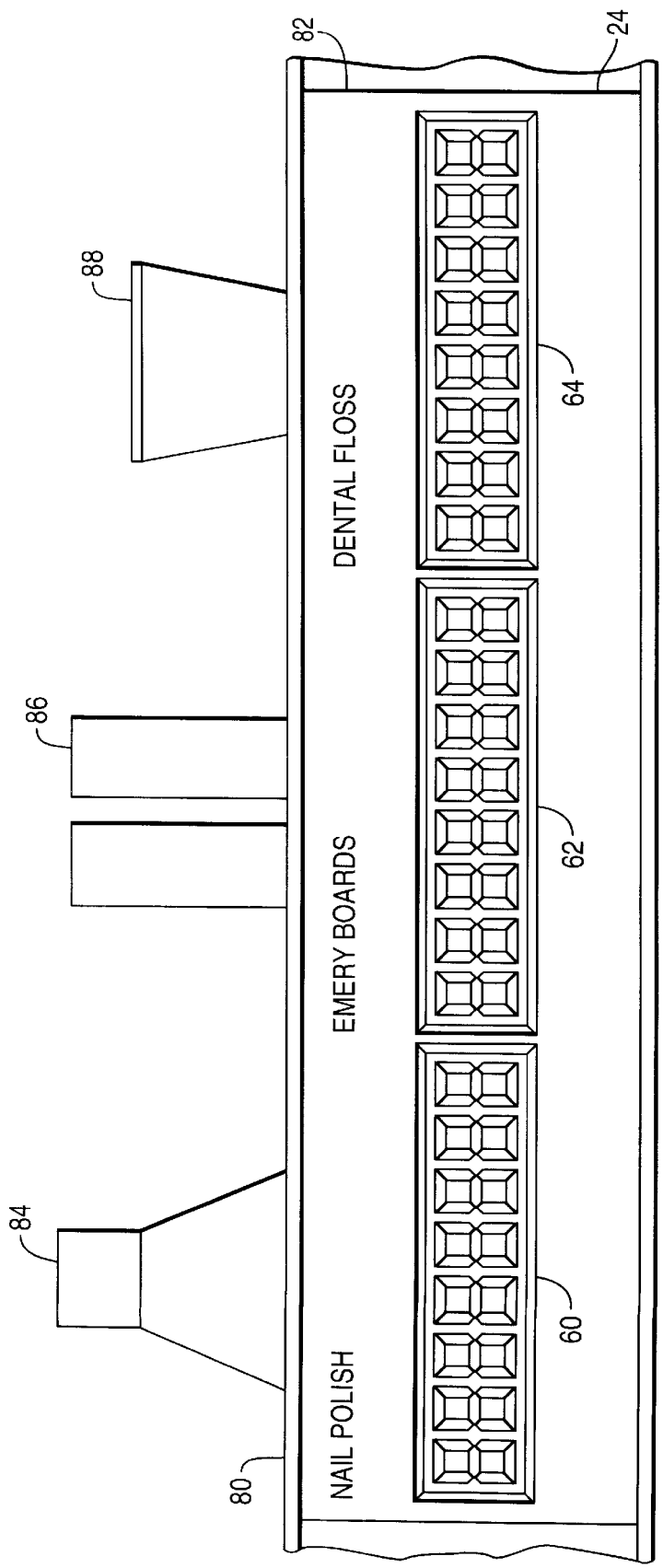
FIG. 3 is a detailed view of an EPL in accordance with the first embodiment of FIG. 2A.

Turning now to FIG. 3, an EPL 24 in accordance with the first embodiment of FIG. 2A is shown. EPL 24 includes a single housing 82 containing the components of FIG. 2A. EPL 24 is particularly suited for displaying prices of items 84–88 which are arranged on shelf 80 in a manner that fails to permit mounting of single EPLs 18 due to lack of space. Separate displays 60–64 are shown for displaying prices of items 84–88. Each of displays 60–64 is driven by its own EPL circuitry within EPL 24. EPL computer 12 controls displays 60–64 by sending messages addressed to the EPL circuitries. Each of displays 60–64 includes a horizontal arrangement of characters. Here, eight characters are shown.

Figure 4:
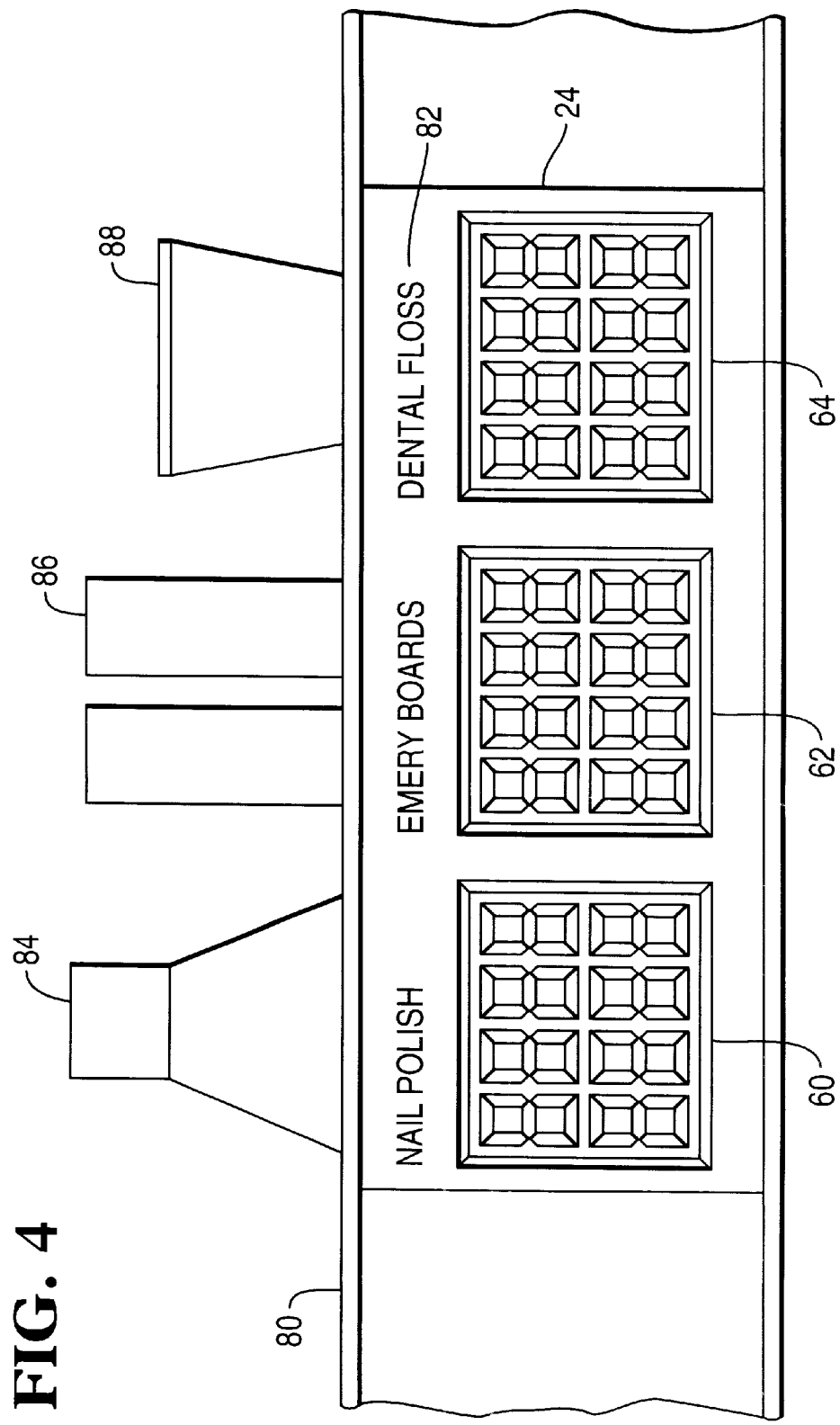
FIG. 4 is a detailed view of another EPL in accordance with the first embodiment of FIG. 2A.

Turning now to FIG. 4, another EPL 24 in accordance with the first embodiment of FIG. 2A is shown. This EPL 24 provides a greater space savings than the EPL 24 of FIG. 3. Each of displays 60–64 includes a horizontal and vertical arrangement of characters. Here, eight characters are shown, arranged four over four.

Figure 5:
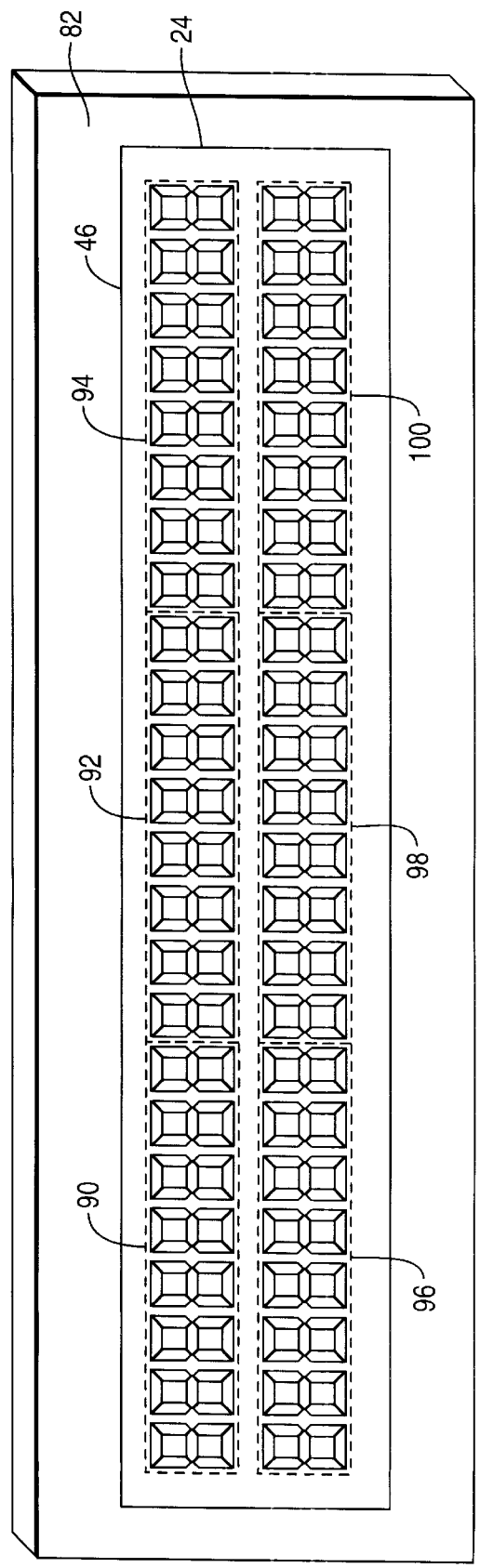
FIG. 5 is a detailed view of an EPL in accordance with the second embodiment of FIG. 2B.

Turning now to FIG. 5, an EPL 24 in accordance with the second embodiment of FIG. 2B is shown. EPL 24 includes a single housing 82 containing the components of FIG. 2B. EPL 24 is particularly suited for displaying promotional messages, including scrolling promotional messages. The promotional messages are formed from the combination of characters displayed by character segments 90–100.

Smaller versions of this type of EPL 24 may also be used to display prices of items 84–88. Here, display 46 includes six character segments 90–100. Each of character segments 90–100 is driven by its own EPL circuitry within EPL 24. EPL computer 12 controls character segments 90–100 by sending messages addressed to the EPL circuitries.

Although the present invention has been described with particular reference to certain preferred embodiments thereof, variations and modifications of the present invention can be effected within the spirit and scope of the following claims.

We claim:

1. An electronic price label (EPL) adapted for displaying prices of items which are arranged on a shelf in a manner that fails to permit mounting of a single EPL per item due to lack of space and for Tirelessly receiving messages including price information and unique EPL identification numbers comprising:
    a housing;
    at least one antenna for Tirelessly receiving said messages;
    a first display within the housing associated with a first item;
    a second display within the housing associated with a second item and mounted proximate the first display; and
    circuitry within the housing for controlling each of the first and second displays in response to said messages so that a message having a first unique EPL identification number and price information for the first item is determined to correspond to the first display so that the information for the first item is displayed on the first display, and so that a message having a second unique EPL identification number and price information for the second item is determined to correspond to the second display so that the price information for the second item is displayed on the second display.

2. The EPL as recited in claim 1, wherein power for said circuitry is provided by a single battery.

3. The EPL as recited in claim 1, wherein said at least one antenna is a single transmit and receive antenna for both wirelessly transmitting and receiving messages.

4. The EPL as recited in claim 1, wherein the first and second displays in addition to separately displaying price information for the first and second items operate in conjunction to display a promotional message formed from a combination of characters displayed by both the first and second displays.

5. The EPL as recited in claim 1, wherein the first and second displays comprise first and second liquid crystal displays which abut one another.

6. The EPL as recited in claim 1, wherein the circuitry comprises first and second individual control circuits for controlling the first and second individual displays.

7. The EPL as recited in claim 6, wherein said at least one antenna comprises first and second transmit and receive antennae coupled to the first and second individual control circuits.

8. The EPL as recited in claim 1 wherein elements of at least one of the first and the second displays are divided into segments arranged one above the other to further compress the overall size of the EPL.

9. The EPL as recited in claim 1, wherein said messages include price information and promotional information, and the first and second displays are controlled to operate in conjunction to display a scrolling promotional message.

10. The EPL as recited in claim 1, wherein the EPL uses modulated backscatter communication techniques.

11. The EPL as recited in claim 1, wherein said circuitry further comprises a separate memory for each of the first and second displays for storing messages received from a store computer designated for the first and second displays, respectively.

12. An electronic price label (EPL) adapted for displaying in a first mode prices of two different items which are arranged on a shelf in a manner that fails to permit mounting of a single EPL per item due to lack of space and in a second mode a promotional message, and for wirelessly receiving messages including price information, promotional message information and unique EPL identification numbers comprising:

a housing;

at least one antenna for wirelessly receiving said messages;

a first display within the housing associated with a first item;

a second display within the housing associated with a second item and mounted proximate the first display; and circuitry within the housing for controlling each of the first and second displays in response to said messages so that a message having a first unique EPL identification number and price information for the first item is determined to correspond to the first display so that the information for the first item is displayed on the first display, so that a message having a second unique EPL identification number and price information for the second item is determined to correspond to the second display so that the price information for the second item is displayed on the second display, and so that promotional message information is displayed utilizing both the first and second display to display a single unified message.

13. The EPL as recited in claim 12, wherein power for said circuitry is provided by a single battery.

14. The EPL as recited in claim 12, wherein said at least one antenna is a single transmit and receive antenna for both wirelessly transmitting and receiving messages.

15. The EPL as recited in claim 12, wherein the first and second displays in addition to separately displaying price information for the first and second items operate in conjunction to display a promotional message formed from a combination of characters displayed by both the first and second displays.

16. The EPL as recited in claim 12, wherein the first and second displays comprise first and second liquid crystal displays which abut one another.

17. The EPL as recited in claim 12, wherein the circuitry comprises first and second individual control circuits for controlling the first and second individual displays.

18. The EPL as recited in claim 17, wherein said at least one antenna comprises first and second transmit and receive antennae coupled to the first and second individual control circuits.

19. The EPL as recited in claim 12 wherein elements of at least one of the first and the second displays are divided into segments arranged one above the other to further compress the overall size of the EPL.

20. The EPL as recited in claim 12, wherein said messages include price information and promotional information, and the first and second displays are controlled to operate in conjunction to display a scrolling promotional message.

21. The EPL as recited in claim 12, wherein the EPL uses modulated backscatter communication techniques.

22. The EPL as recited in claim 12, wherein said circuitry further comprises a separate memory for each of the first and second displays for storing messages received from a store computer designated for the first and second displays, respectively.

* * * * *

UNITED STATES PATENT AND TRADEMARK OFFICE
CERTIFICATE OF CORRECTION

PATENT NO. : 6,243,690 B1  
DATED : June 5, 2001  
INVENTOR(S) : Andrew J. Adamec et al.

Page 1 of 1

It is certified that error appears in the above-identified patent and that said Letters Patent is hereby corrected as shown below:

<u>Column 4,</u>  
Line 23, delete "Tirelessly" and substitute -- wirelessly --.  
Line 27, delete "Tirelessly" and substitute -- wirelessly --.

Signed and Sealed this

Sixteenth Day of April, 2002

Attest:

JAMES E. ROGAN  
*Director of the United States Patent and Trademark Office*

*Attesting Officer*